(12) United States Patent
Fukuyama et al.

(10) Patent No.: US 8,607,096 B2
(45) Date of Patent: Dec. 10, 2013

(54) DEVICE AND METHOD FOR COLLECTING NETWORK FAILURE INFORMATION

(75) Inventors: Noriyuki Fukuyama, Kawasaki (JP);
Hideaki Miyazaki, Kobe (JP);
Masanobu Morinaga, Kawasaki (JP);
Sumiyo Okada, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 349 days.

(21) Appl. No.: 13/193,048

(22) Filed: Jul. 28, 2011

(65) Prior Publication Data

US 2011/0289353 A1 Nov. 24, 2011

Related U.S. Application Data

(63) Continuation of application No. PCT/JP2009/000409, filed on Feb. 3, 2009.

(51) Int. Cl.
*G06F 11/00* (2006.01)

(52) U.S. Cl.
USPC .......................................................... 714/32

(58) Field of Classification Search
USPC .............. 714/1–3, 4.1, 25–28, 32, 33, 37, 39, 714/44–46, 47.1, 48, 712, 820, 821
See application file for complete search history.

(56) References Cited

U.S. PATENT DOCUMENTS

| | | | | |
|---|---|---|---|---|
| 5,872,911 A | * | 2/1999 | Berg ................................ | 714/43 |
| 6,128,753 A | * | 10/2000 | Keeble et al. .................... | 714/25 |
| 6,504,841 B1 | * | 1/2003 | Larson et al. ................... | 370/386 |
| 7,197,558 B1 | * | 3/2007 | Harper et al. ................... | 709/224 |
| 7,373,544 B2 | * | 5/2008 | Guzman et al. ................. | 714/4.3 |
| 7,788,544 B2 | * | 8/2010 | Allen et al. ...................... | 714/47.1 |
| 8,027,364 B2 | * | 9/2011 | Becattini et al. ................ | 370/473 |

(Continued)

FOREIGN PATENT DOCUMENTS

| | | |
|---|---|---|
| JP | 2001-036937 | 9/2001 |
| JP | 2005-286777 | 10/2005 |
| JP | 2006-229477 | 8/2006 |
| JP | 2006-319520 | 11/2006 |

OTHER PUBLICATIONS

International Search Report issued Mar. 3, 2009 in corresponding International Application PCT/JP2009/000409.

(Continued)

*Primary Examiner* — Nadeem Iqbal
(74) *Attorney, Agent, or Firm* — Staas & Halsey LLP

(57) ABSTRACT

An apparatus to collect information about network failure includes: a normal mode packet assembly unit to assemble a transmission packet from transmission data output from an application in a normal mode being a procedure used when a transmission process is performed by specified communication protocol; a special mode packet assembly unit to assemble the transmission packet from the transmission data in a special mode being a procedure in which a procedure for collecting failure information is embedded into the procedure used when a transmission process is performed by the specified communication protocol; a switching control unit to activate the normal mode packet assembly unit or the special mode packet assembly unit selectively; and a response analysis unit to collect failure information according to a behavior of the response to the transmission packet transmitted from the special mode packet assembly unit.

15 Claims, 21 Drawing Sheets

(56) References Cited

U.S. PATENT DOCUMENTS

| | | | |
|---|---|---|---|
| 2004/0153698 A1* | 8/2004 | Guzman et al. | 714/4 |
| 2006/0090096 A1* | 4/2006 | Guzman et al. | 714/4 |
| 2006/0114819 A1* | 6/2006 | Shimizu | 370/219 |
| 2006/0182036 A1* | 8/2006 | Sasagawa et al. | 370/242 |
| 2009/0094484 A1* | 4/2009 | Son et al. | 714/26 |
| 2010/0100775 A1* | 4/2010 | Slutsman et al. | 714/47 |

OTHER PUBLICATIONS

English Abstract and Translation of Japanese Published Patent Application 2000-13374.

English Abstract and Translation of Japanese Published Patent Application 2002-169732.

English Abstract and Translation of Japanese Published Patent Application 2004-15645.

* cited by examiner

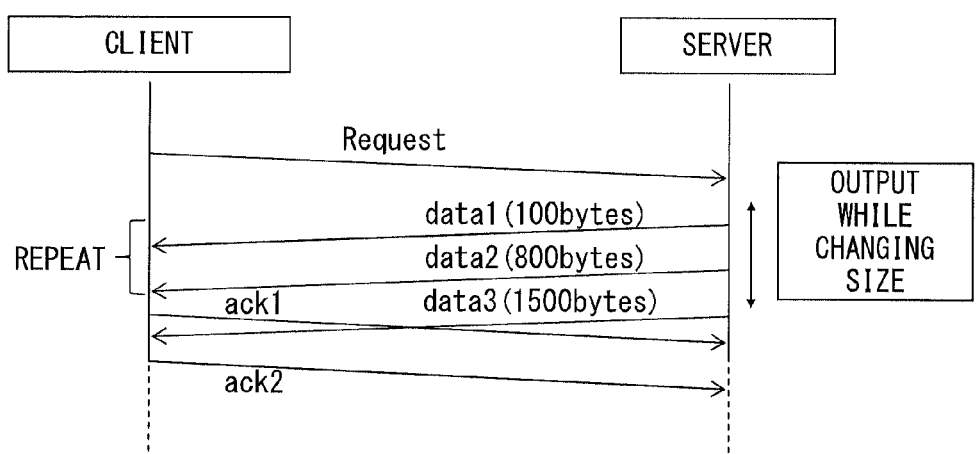
F I G. 1 7

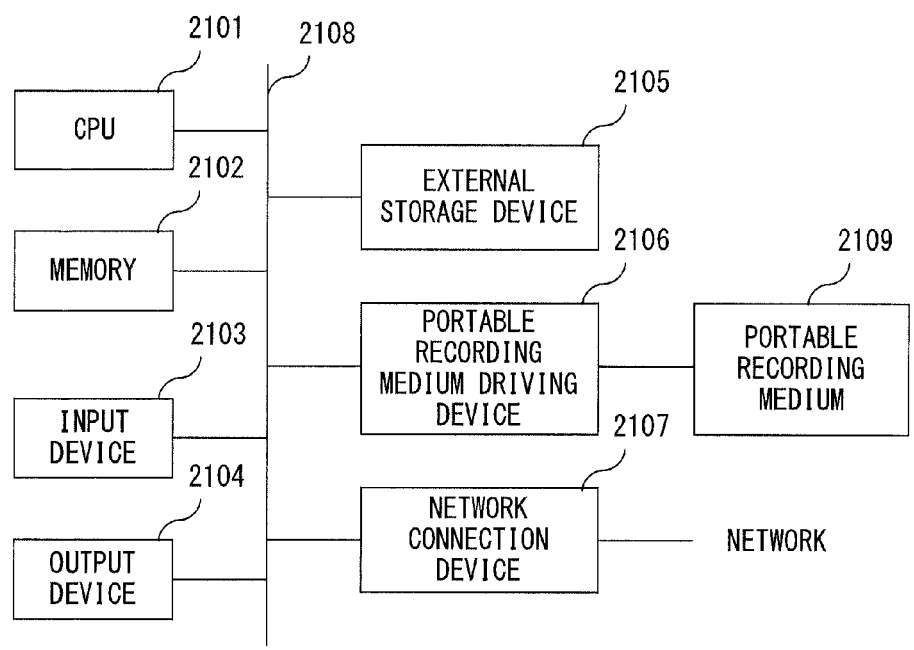
F I G. 21

DEVICE AND METHOD FOR COLLECTING NETWORK FAILURE INFORMATION

CROSS-REFERENCE TO RELATED APPLICATION

This application is a continuation of an international application PCT/JP2009/000409, which was filed on Feb. 3, 2009.

FIELD

The embodiments described in this application is related to a device and a method for collecting network failure information.

A technique disclosed herein may be applied to a technique of collecting failure information to realize early detection and early repair of a failure in an IP (Internet Protocol) network. The technique disclosed herein may also be applied to traffic such as HTTP (Hyper Text Transfer Protocol) for Web services and VoIP (VoiceoverIP) for IP telephone services. The technique disclosed herein may also be applied to an IP network monitoring apparatus (systems) and software, and furthermore, to monitoring services using those apparatus and software.

BACKGROUND

Conventionally, when a failure occurs in an IP network, search for the cause and location of the network failure is performed with a failure diagnosis tool connected to the network and diagnosis IP packets are transmitted from the tool. In addition, a test command is periodically issued to monitor the operational status of devices connected to the network and to obtain the network configuration information. The test command includes obtaining MIB (Massage Information Base) information by SNMP (Simple Network Management Protocol), a trace route command, and the like.

However, the conventional failure information collection technique, which uses the failure diagnosis tool or test commands as described above, has a problem that communication with traffic that is not originally required for the network services such as Web services and IP telephone services (a series of transmission/reception of IP packets) is required only for searching for the cause and location of the failure. For this reason, according to the management policy of the network, Web services and IP telephone services may be congested due to traffic that is not originally required for users of the network service, and it is not allowed to transmit the traffic for searching for the cause or location of the failure since the influence of the failure may be increased. As a result, there has been a problem that it is difficult to detect the situation in which the failure is occurring, and it may takes a long time to fix the failure.

As related techniques, configuration or method to switch communication modes according to the communication quality and communication situation has been proposed (for example, Japanese Laid-open Patent Publication No. 2006-319520, Japanese Laid-open Patent Publication No. 2001-36937, Japanese Laid-open Patent Publication No. 2005-286777). However, these conventional techniques do not relate to the configuration or method to perform collection of failure information without having influence on the operation of network services such as Web services and IP telephone services.

SUMMARY

According to an aspect of an invention, a network failure information collection apparatus to collect information about network failure in a network communication apparatus connected to a packet network, includes: a normal mode packet assembly unit to assemble a transmission packet from transmission data output from an application in a normal mode being a procedure used when a transmission process is performed by specified communication protocol and to transmit the transmission packet to the packet network; a special mode packet assembly unit to assemble the transmission packet from the transmission data in a special mode being a procedure in which a procedure for collecting failure information is embedded into the procedure used when a transmission process is performed by the specified communication protocol and to transmit the transmission packet to the packet network; a switching control unit to activate the normal mode packet assembly unit or the special mode packet assembly unit selectively; a response analysis unit to analyze a response to the transmission packet based on a received packet from the packet network and to collect failure information according to a behavior of the response to the transmission packet transmitted from the special mode packet assembly unit; and an output unit to output the failure information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 illustrates an example of a sequence of size dependence process.

FIG. 21 illustrates hardware configuration to realize the embodiments.

DESCRIPTION OF EMBODIMENTS

Hereinafter, embodiments are described in detail with reference to drawings.

Figure 1:
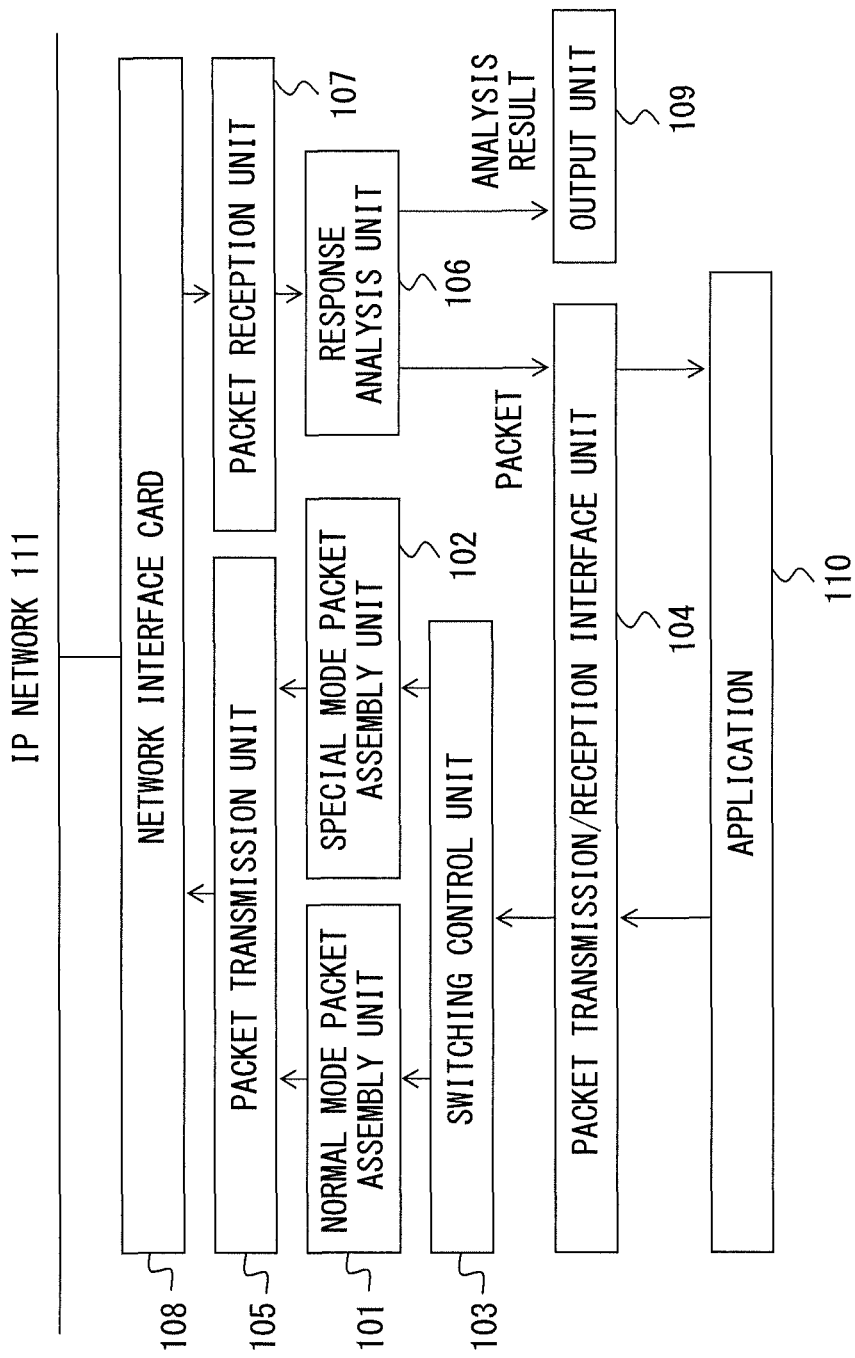
FIG. 1 illustrates a configuration of the first embodiment.
Figure 2:
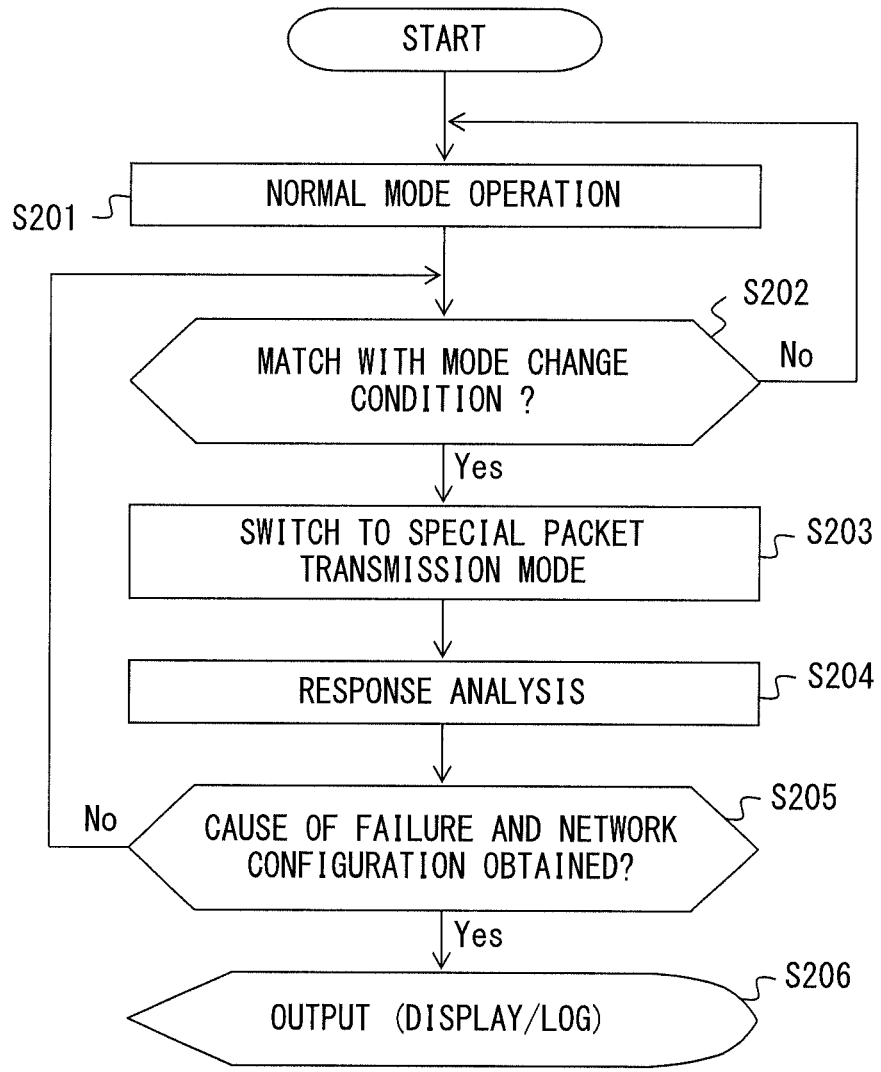
FIG. 2 is a flowchart illustrating an operation of the first embodiment.

FIG. 1 illustrates a configuration of a network communication apparatus according to the first embodiment. The network communication apparatus can collect failure information while using a network service. FIG. 2 is a flowchart illustrating the operation of the network communication apparatus according to the first embodiment.

A switching control unit 103 makes a normal mode packet assembly unit 101 operate at the time of the normal operation.

Transmission data transmitted from an application 110 such as Web and an IP phone is guided to the normal mode packet assembly unit 101 through a packet transmission/reception interface unit 104 and the switching control unit 103. The normal mode packet assembly unit 101 assembles a transmission packet according to the packet assembly scheme such as TCP/IP (Transmission Control Protocol/Internet Protocol) and the like. The transmission packets are transmitted from a packet transmission unit 105 to an IP network 111 through a network interface card 108.

Meanwhile, received packets from the IP network 111 are received at a packet reception unit 107 through the network interface card 108. A response analysis unit 106 performs analysis of the reception state according to the received packets and obtaining reception data from the received packets. The obtained data is guided to the application 110 through the packet transmission/reception interface unit 104.

The switching control unit 103 judges whether or not the communication state matches the mode change condition (S202 in FIG. 2). When the judgment is NO in step S202, the switching control unit 103 makes the network communication apparatus perform the packet transmission/reception operation in the normal mode using the normal mode packet assembly unit 101 (S201-S202 in FIG. 2).

When the judgment turns to YES in step S202, the switching control unit 103 switches the communication mode to a special packet transmission mode using a special mode packet assembly unit 102. The special mode packet assembly unit 102 assembles transmission packets in a special packet transfer pattern according to a failure of the network and the like from the transmission data of the network service received from the application 110 through the transmission/reception interface unit 104. Then the special mode packet assembly unit 102 transmits the transmission packet. (S202-S203 in FIG. 2)

When a packet is received at the packet reception unit 107, the response analysis unit 106 performs collection of failure information such as the cause of the failure, the location of the failure, or the network configuration (S204 in FIG. 2). When the failure information is obtained, the response analysis unit 106 makes an output unit 109 output or display the information (S205-S206 in FIG. 2). When the failure information is not received in the response analysis unit 106, the switching control unit 103 repeats the judgment process of the switching condition (S205 to S202 in FIG. 2), to control the shift between the normal mode and the special mode.

Figure 3:
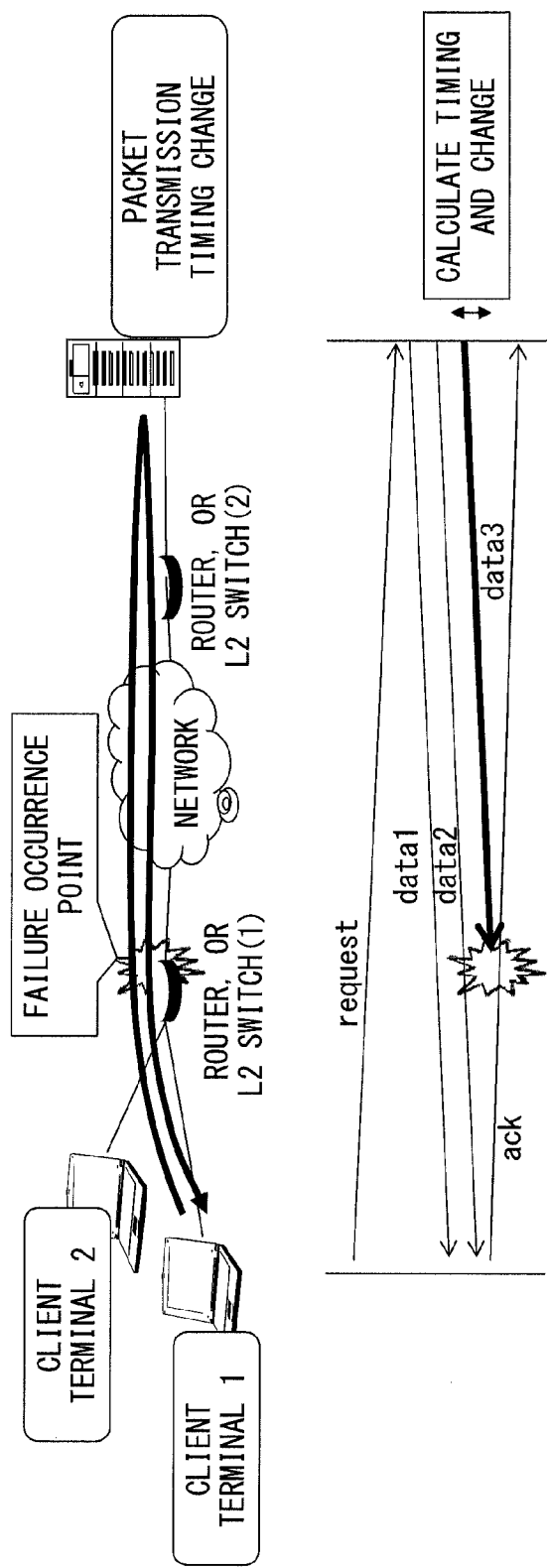
FIG. 3 and FIG. 4 illustrate an operation of the first embodiment.
Figure 4:
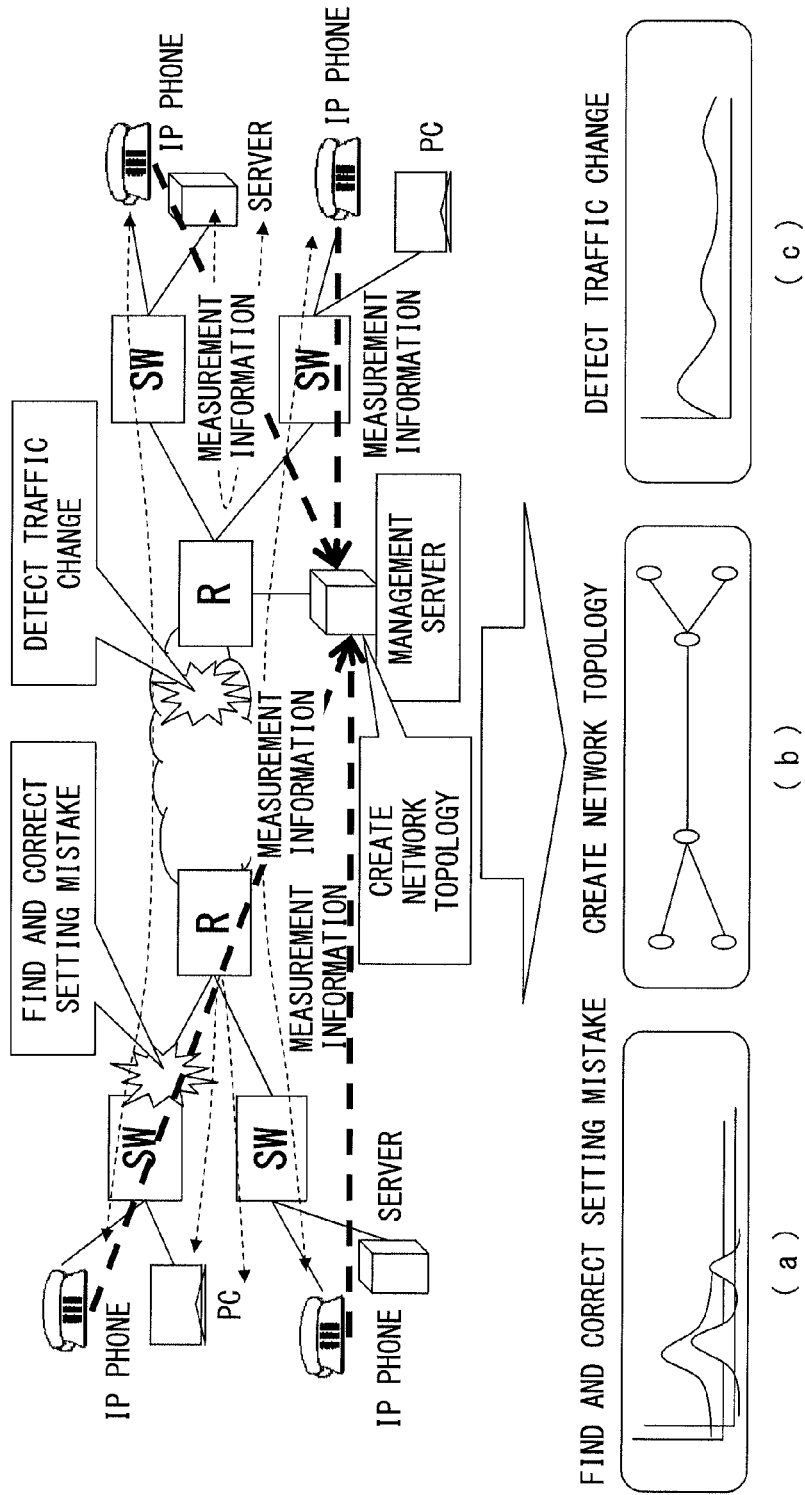

The operation of the first embodiment will be below with reference to FIG. 3 and FIG. 4.

Conventionally, the degradation of quality could be detected with the user traffic, however, it is difficult to identify the cause and location of the failure. As described above, when the identification of the cause and location of the failure is performed by active probing using a failure diagnosis tool, a test command and the like, unnecessary traffic is to be generated, affecting the network usage efficiency and contract.

Thus, in the first embodiment, identification of the detection of quality degradation and identification of the cause of the failure is realized only with the usage of network, by making the user traffic itself have an effect that is equivalent to active probing.

In the first embodiment illustrated in FIG. 1, the special mode packet assembly unit 102 embeds a special failure analysis pattern in user packets. For example, the special mode packet assembly unit 102 changes the transmission pattern using the traffic of the user. That is, as illustrated in FIG. 3 for example, in the transmission of transmission packets of TCP/IP, the special mode packet assembly unit 102 controls the transmission timing of a user data packet "data" with respect to a response packet "ack", to deliberately generate collision of packets at a specific router and the like. Then the response analysis unit 106 analyzes the occurrence trend of the packet loss in the special mode to estimate the cause of the failure occurring between a server apparatus and a client PC, for example.

The special mode packet assembly unit 102 is capable of performing an operation to successively transmit some packets in a sequence of TCP (Transmission Control Protocol) and UDP (User Data Protocol) as a special packet transfer pattern. In addition, the special mode packet assembly unit 102 is capable of changing the TTL (Time To Live: the valid period of a packet) of a transmission packet as a special packet transfer pattern.

Meanwhile, in the first embodiment, when the special mode change condition is satisfied in step S202 in FIG. 2, the switching control unit 103 changes from the process of the normal mode packet assembly unit 101 to the process of the special mode packet assembly unit 102. As the special mode change condition, "schedule" may be used. In this case, the special mode is activated, for example, at a constant time interval defined by the schedule. This will be described later as the third embodiment. In addition, the special mode change condition may be an instruction given from outside. In this case, the special mode is activated according to the instruction. This will be described later as the fourth embodiment. As a yet further example, the special mode change condition may be status of the traffic. In this case, the special mode is activated when specific traffic transmission/reception situation is detected. As the specific traffic transmission/reception situation in this regard, for example, when a packet loss (exceeding a specific value) occurs, when a delay (exceeding a specific value) occurs, or when a delay fluctuation (exceeding a specific value) occurs, and so on, can be assumed. These will be described later as the fifth embodiment.

The network communication apparatus according to the first embodiment illustrated in FIG. 1 may be applied to a Web server computer, a Web client computer (such as a normal PC (Personal Computer)), an IP telephone terminal apparatus, or a network device such as a router and a switch.

By the application of the first embodiment to these apparatuses, it becomes possible to provide a service of "network setting optimization proposal and setting mistake remote automatic correction" as illustrated in FIG. 4(a) for example to detect and correct a setting mistake in a network.

In addition, as illustrated in FIG. 4(b) for example, it becomes possible to provide a service of "network topology creation assistance" by comprehending or detecting the change of the network configuration.

Furthermore, as illustrated in FIG. 4(c) for example, it becomes possible to provide a service of "network update proposal" by comprehending or detecting the traffic fluctuation in a network.

Figure 5:
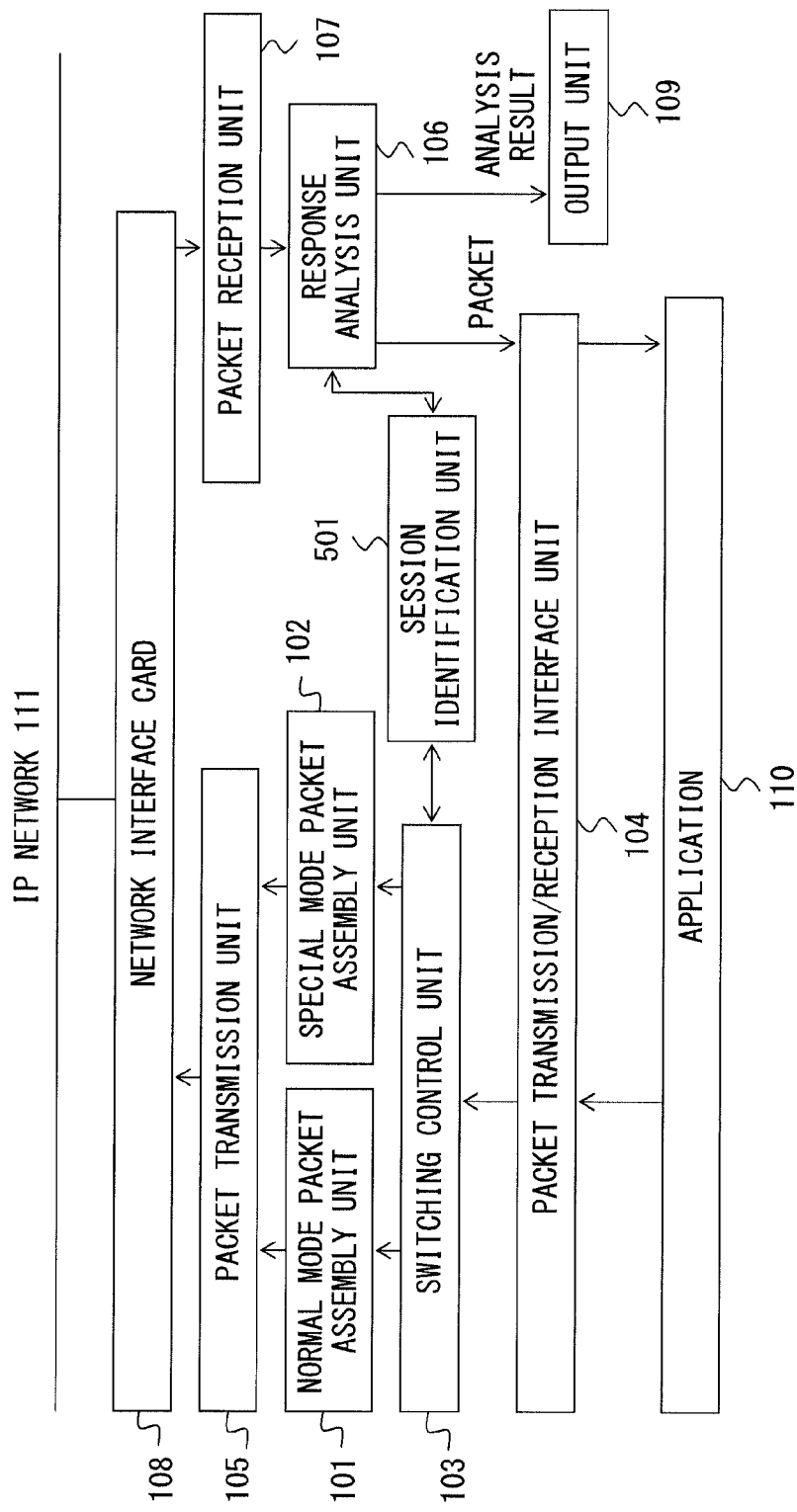
FIG. 5 illustrates a configuration of the second embodiment.
Figure 6:
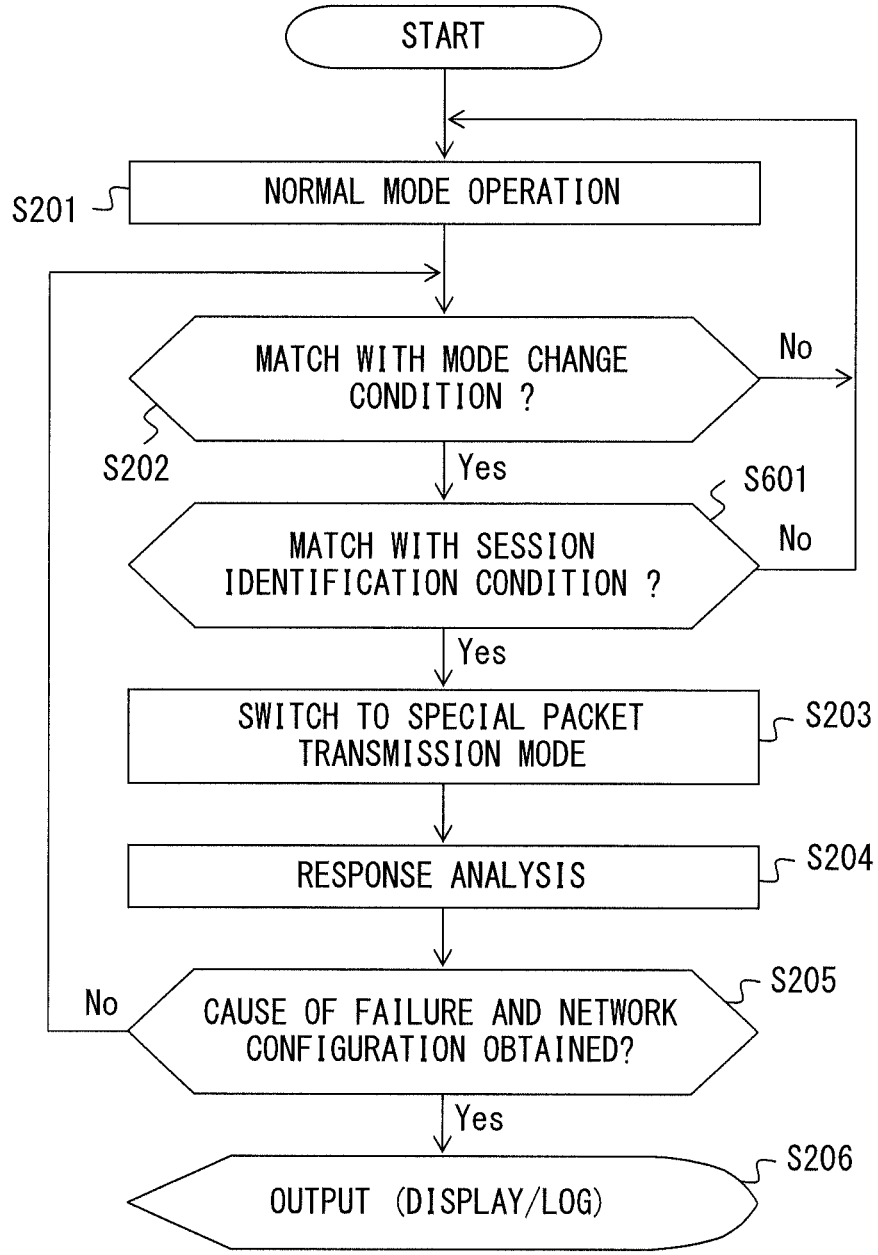
FIG. 6 is a flowchart illustrating an operation of the second embodiment.

FIG. 5 illustrates a configuration of a network communication apparatus according to the second embodiment. The network communication apparatus is capable of collecting failure information while using a network service. FIG. 6 is a flowchart illustrating the operation of the network communication apparatus according to the second embodiment. In FIG. 5, the same numbers are assigned to the elements that perform similar processes as in the first embodiment in FIG. 1. In addition, in FIG. 6, the same numbers are assigned to the steps that perform similar processes as in the first embodiment in FIG. 2.

The configuration in FIG. 5 differs from the configuration in FIG. 1 as follows. That is, in the second embodiment, the switching control unit 103 performs the switching of operation modes from the normal mode by the normal mode packet assembly unit 101 to the special mode by the special mode packet assembly unit 102 when a session identification condition prepared in advance in a session identification unit 501 is satisfied.

That is, after detecting a match with a special mode change condition in step S202 in FIG. 6, the switching control unit 103 judges, in step S601, whether or not the session identification condition prepared in advance in a session identification unit 501 is satisfied. When the judgment in step S601 is YES, the switching control unit 103 switches operation modes to generate transmission packets from the normal mode by the normal mode packet assembly unit 101 to the special mode by the special mode packet assembly unit 102.

By the configuration and the operation of the second embodiment described above, it becomes possible to collect failure information only for specific network services that perform TCP communication such as Web and that perform UDP communication such as IP phone and softphone. The configuration and the operation of the second embodiment may be applied to apparatus that performs TCP communication such as a server computer that provides the specific network services as described above or a client computer that receives the services. In addition, it may also be applied to apparatuses such as an IP phone terminal and a softphone terminal that perform UDP communication, especially to a network communication protocol of RTCP (Real-time Transport Control Protocol) with which real-time operation is not required.

Figure 7:
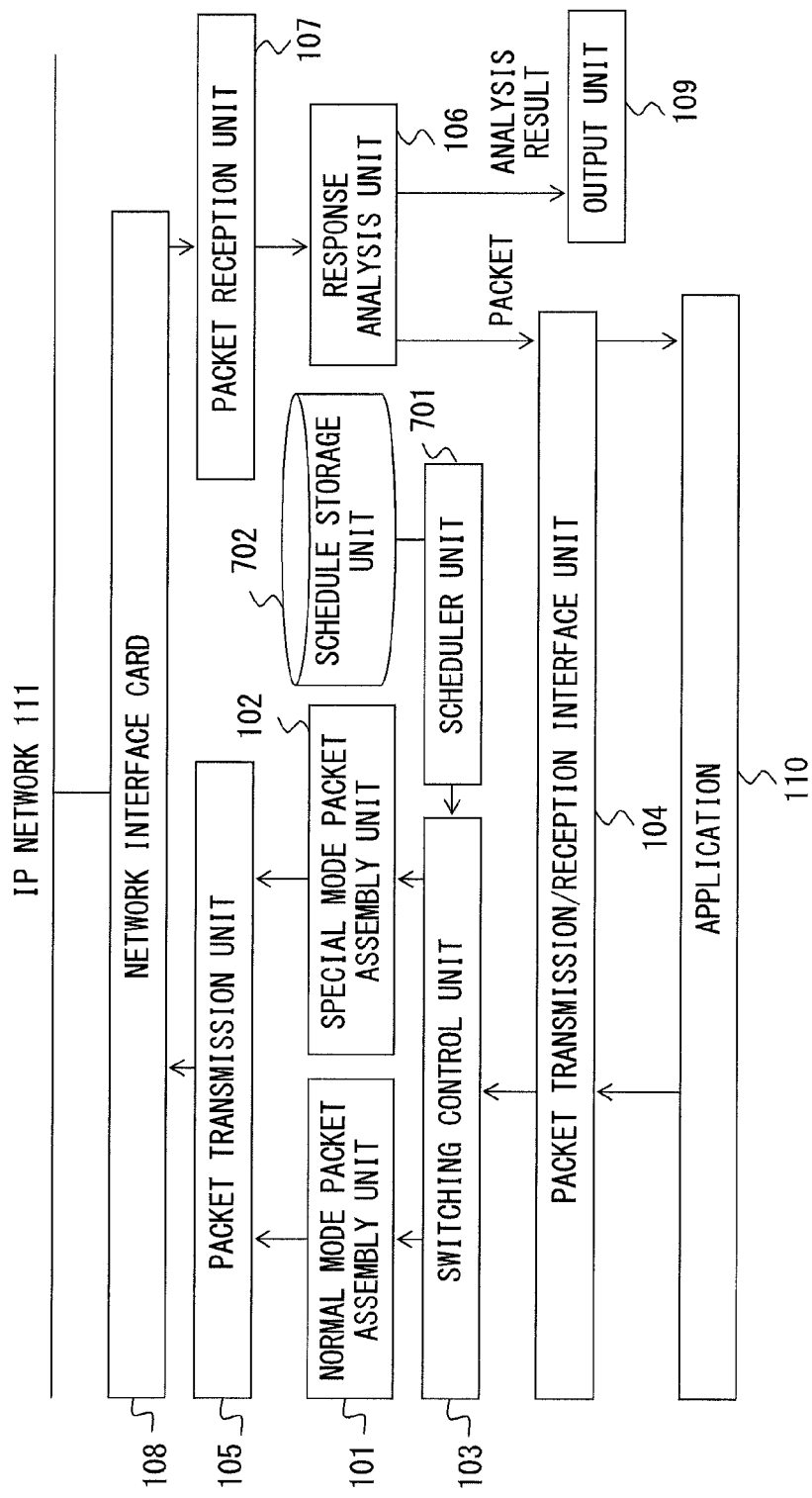
FIG. 7 illustrates a configuration of the third embodiment.
Figure 8:
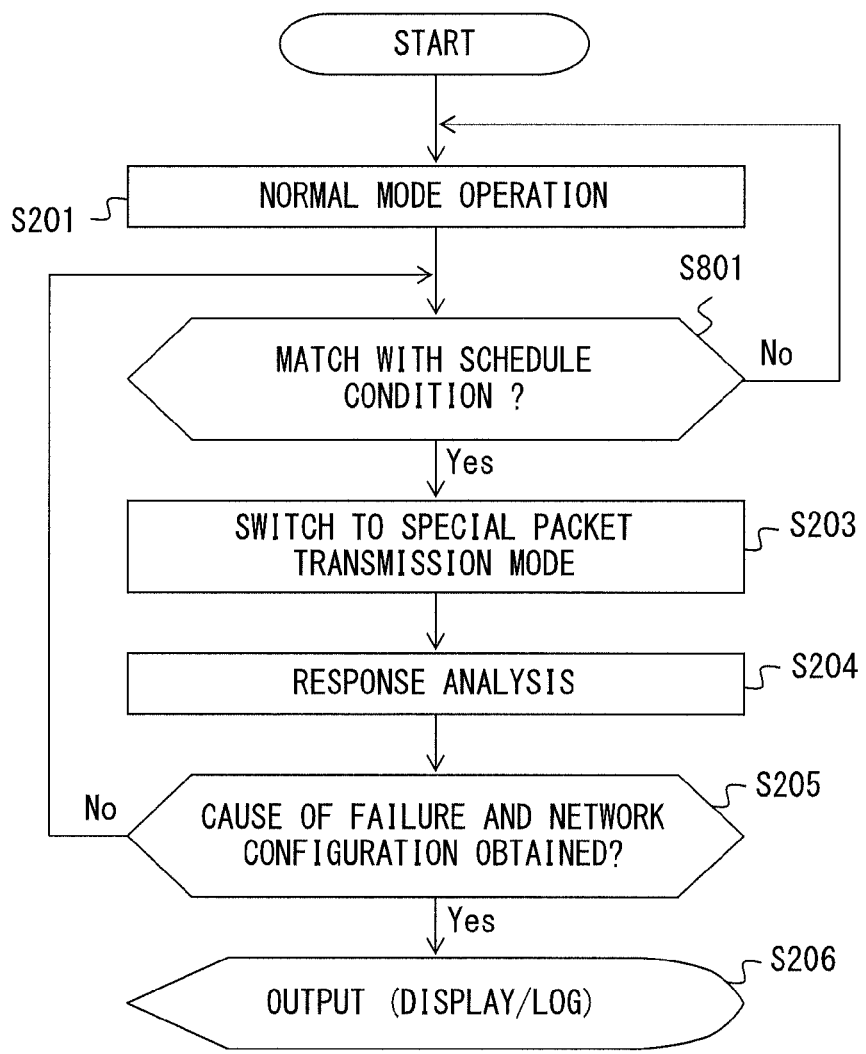
FIG. 8 is a flowchart illustrating an operation of the third embodiment.

FIG. 7 illustrates a configuration of a network communication apparatus according to the third embodiment. The network communication apparatus is capable of collecting failure information while using a network service. FIG. 8 is a flowchart illustrating the operation of the network communication apparatus according to the third embodiment. In FIG. 7, the same numbers are assigned to the elements that perform similar processes as in the first embodiment in FIG. 1. In addition, in FIG. 8, the same numbers are assigned to the steps that perform similar processes as in the first embodiment in FIG. 2.

The configuration in FIG. 7 differs from the configuration in FIG. 1 as follows. That is, in the third embodiment, the switching control unit 103 performs the switching of operation modes from the normal mode by the normal mode packet assembly unit 101 to special mode by the special mode packet assembly unit 102 when a scheduler unit 701 detects that a schedule condition stored in a schedule storage unit 702 is satisfied.

That is, the switching control unit 103 judges, in step S801 in FIG. 8, whether or not scheduler unit 701 detects the schedule condition stored in the schedule storage unit 702 is satisfied. When the judgment in step S801 is YES, the switching control unit 103 switches operation modes to generate transmission packets from the normal mode by the normal mode packet assembly unit 101 to the special mode by the special mode packet assembly unit 102.

By the configuration and the operation of the third embodiment described above, it becomes possible to collect failure according to a schedule condition prepared in advance by a network operation administrator. Accordingly, it becomes possible to collect failure information late at night when the network service is less used for example, making it possible to minimize the influence on the network service.

Figure 9:
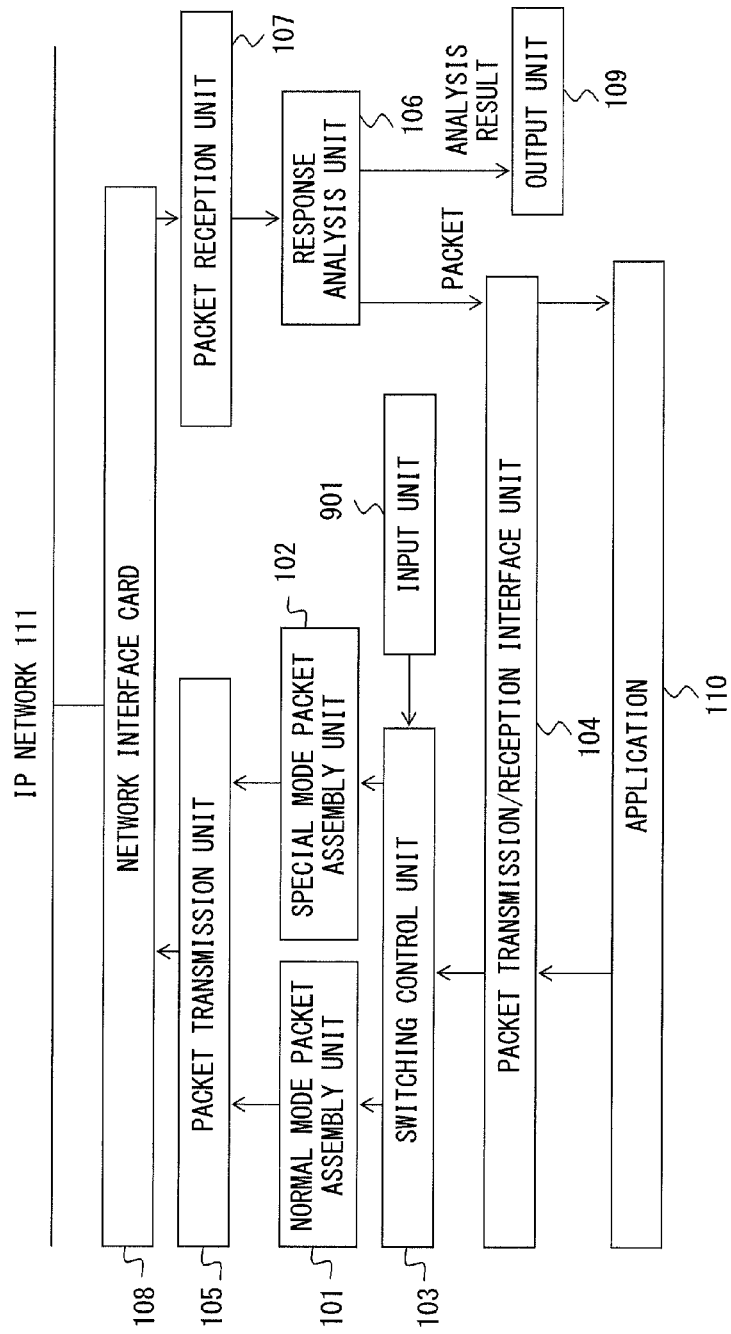
FIG. 9 illustrates a configuration of the fourth embodiment.
Figure 10:
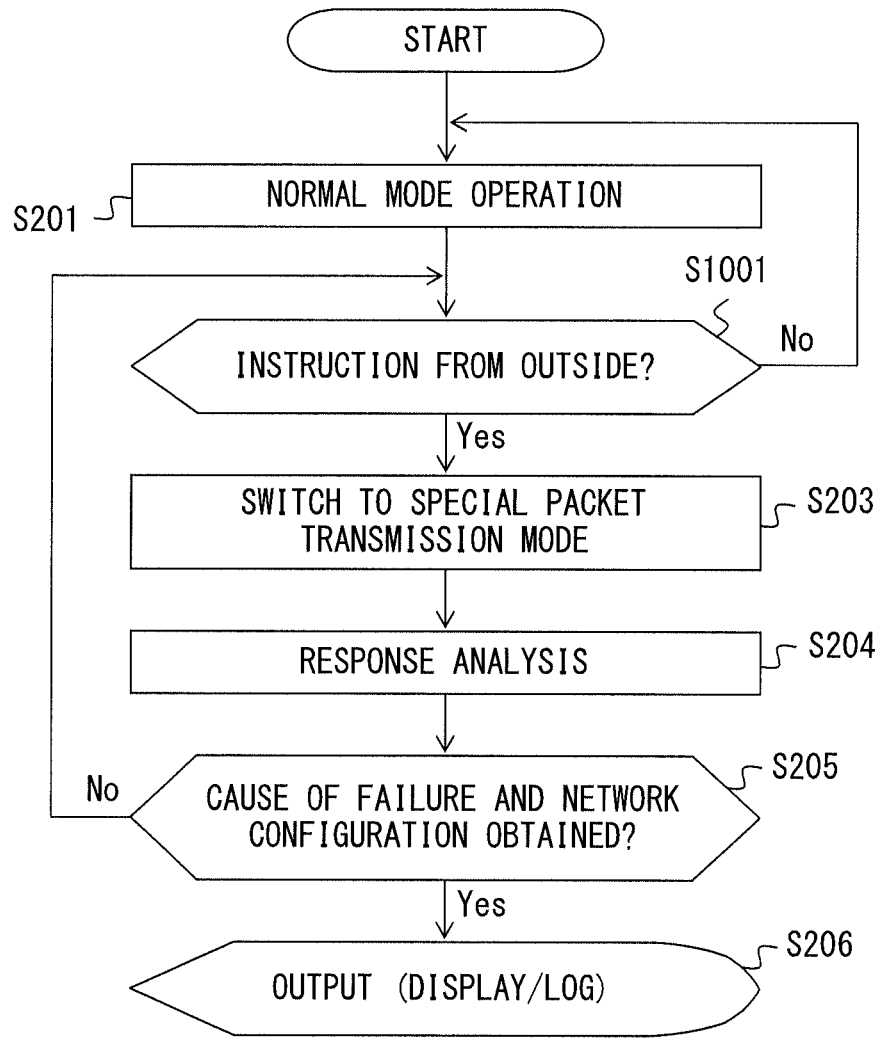
FIG. 10 is a flowchart illustrating an operation of the fourth embodiment.

FIG. 9 illustrates a configuration of a network communication apparatus according to the fourth embodiment. The network communication apparatus is capable of collecting failure information while using a network service. FIG. 10 is a flowchart illustrating the operation of the network communication apparatus according to the fourth embodiment. In FIG. 9, the same numbers are assigned to the elements that perform similar processes as in the first embodiment in FIG. 1. In addition, in FIG. 10, the same numbers are assigned to the steps that perform similar processes as in the first embodiment in FIG. 2.

The configuration in FIG. 9 differs from the configuration in FIG. 1 as follows. That is, in the fourth embodiment, the switching control unit 103 performs the switching of operation modes from the normal mode by the normal mode packet assembly unit 101 to the special mode by the special mode packet assembly unit 102 when a network operation administrator and the like issues an instruction for mode switching using an input unit 901.

That is, the switching control unit 103 judges, in step S1001 in FIG. 10, whether or not a network operation administrator and the like issues an instruction for mode switching using the input unit 901. When the judgment in step S1001 is YES, the switching control unit 103 switches operation modes to generate transmission packets from the normal mode by the normal mode packet assembly unit 101 to the special mode by the special mode packet assembly unit 102.

By the configuration and the operation of the fourth embodiment described above, the network operation administrator can collect failure information at arbitrary timing.

Figure 11:
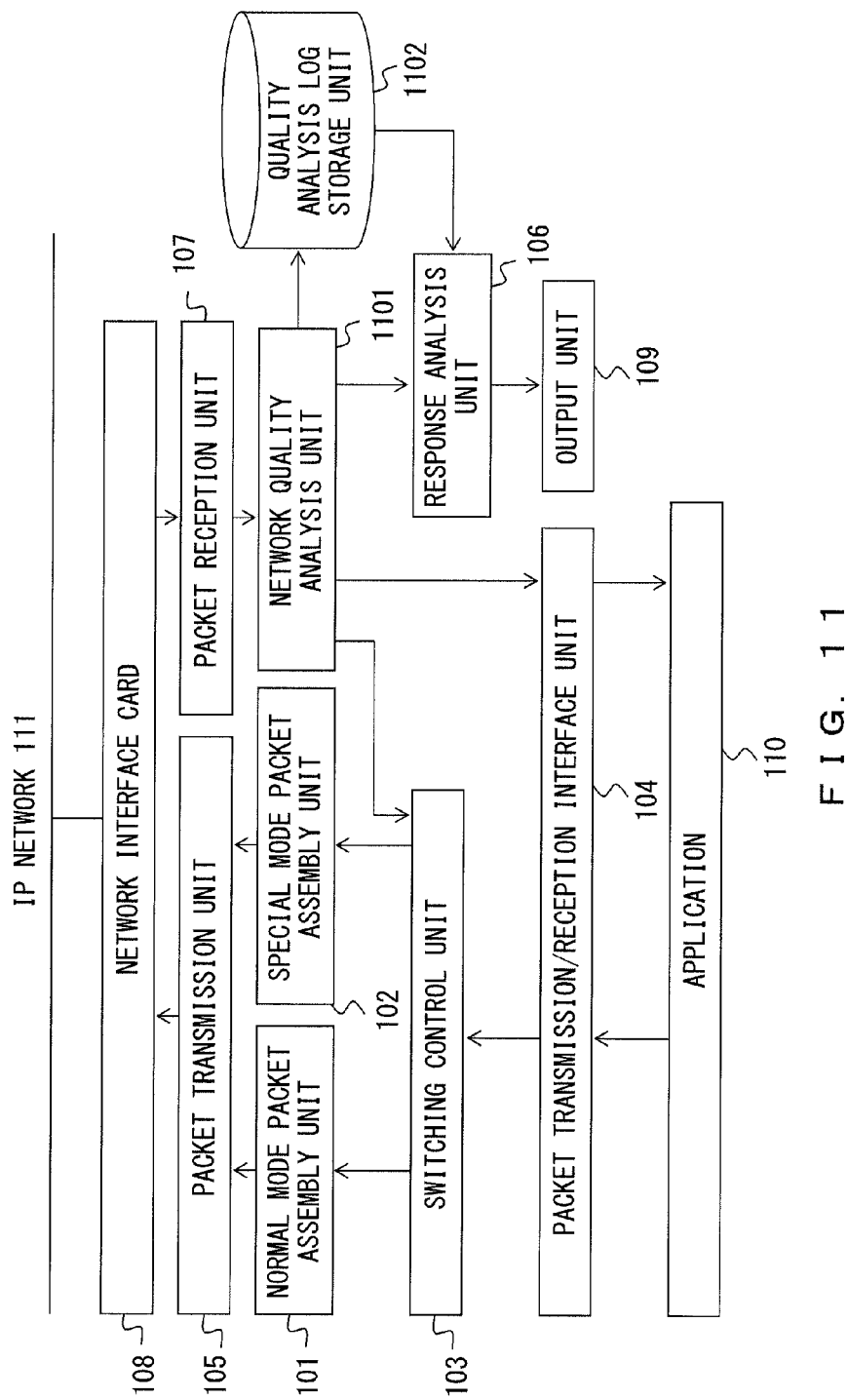
FIG. 11 illustrates a configuration of the fifth embodiment.
Figure 12:
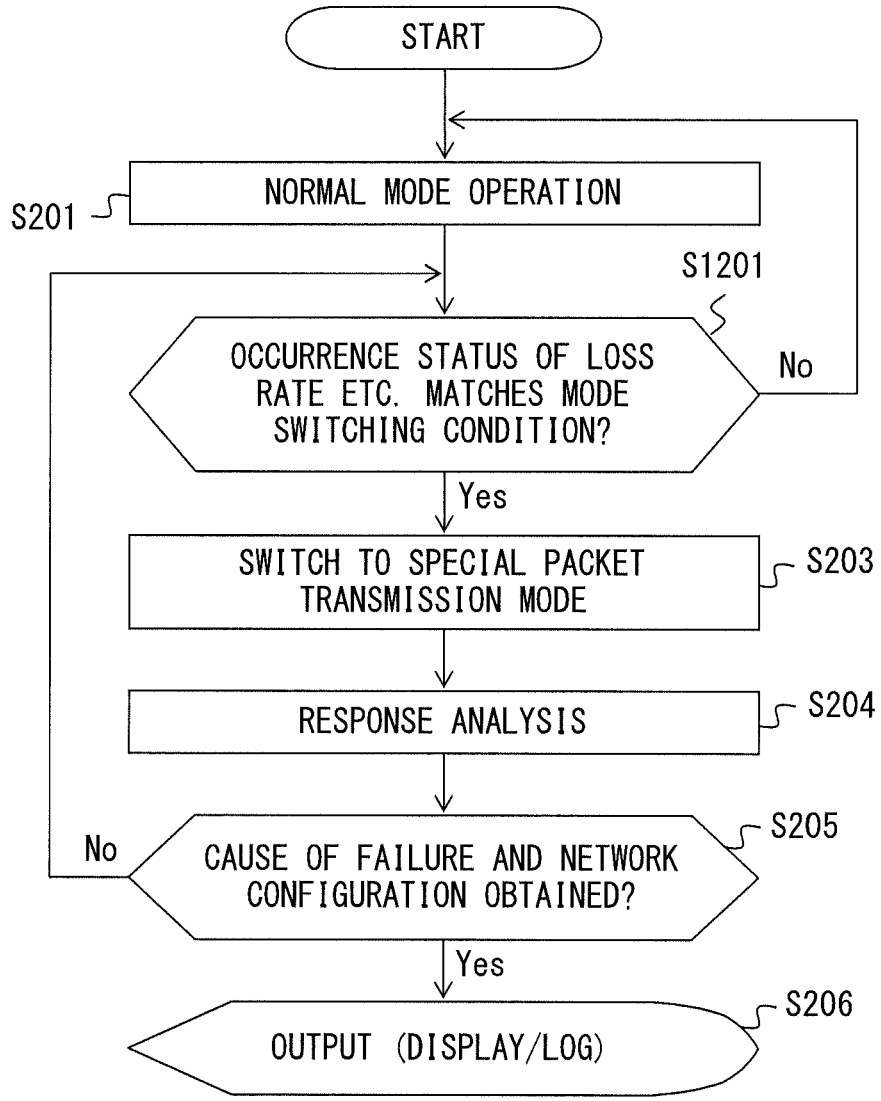
FIG. 12 is a flowchart illustrating an operation of the fifth embodiment.

FIG. 11 illustrates a configuration of a network communication apparatus according to the fifth embodiment. The network communication apparatus is capable of collecting failure information while using a network service. FIG. 12 is a flowchart illustrating the operation of the network communication apparatus according to the fifth embodiment. In FIG. 11, the same numbers are assigned to the elements that perform similar processes as in the first embodiment in FIG. 1. In addition, in FIG. 12, the same numbers are assigned to the steps that perform similar processes as in the first embodiment in FIG. 2.

The configuration in FIG. 11 differs from the configuration in FIG. 1 as follows. That is, in the fifth embodiment, the switching control unit 103 performs the switching of operation modes from the normal mode by the normal mode packet assembly unit 101 to the special mode by the special mode packet assembly unit 102 according to the analysis result of the network quality with respect to received packets by a network quality analysis unit 1101.

That is, the switching control unit 103 judges, in step S1201 in FIG. 12, whether or not the loss rate of the received packets for example satisfies the condition for mode switching in the network quality analysis unit 1101. When the judgment in step S1201 is YES, the switching control unit 103 switches operation modes to generate transmission packets from the normal mode by the normal mode packet assembly unit 101 to the special mode by the special mode packet assembly unit 102.

The network quality analysis unit 1101 may analyze, for example, whether or not delay exceeds a specified value, or whether or not delay fluctuation exceeds a specified value. Then the switching control unit 103 may perform the mode switching according to the analysis result.

By the configuration and the operation of the fifth embodiment described above, the network communication apparatus can automatically collect failure information when the network quality deteriorates.

Figure 13:
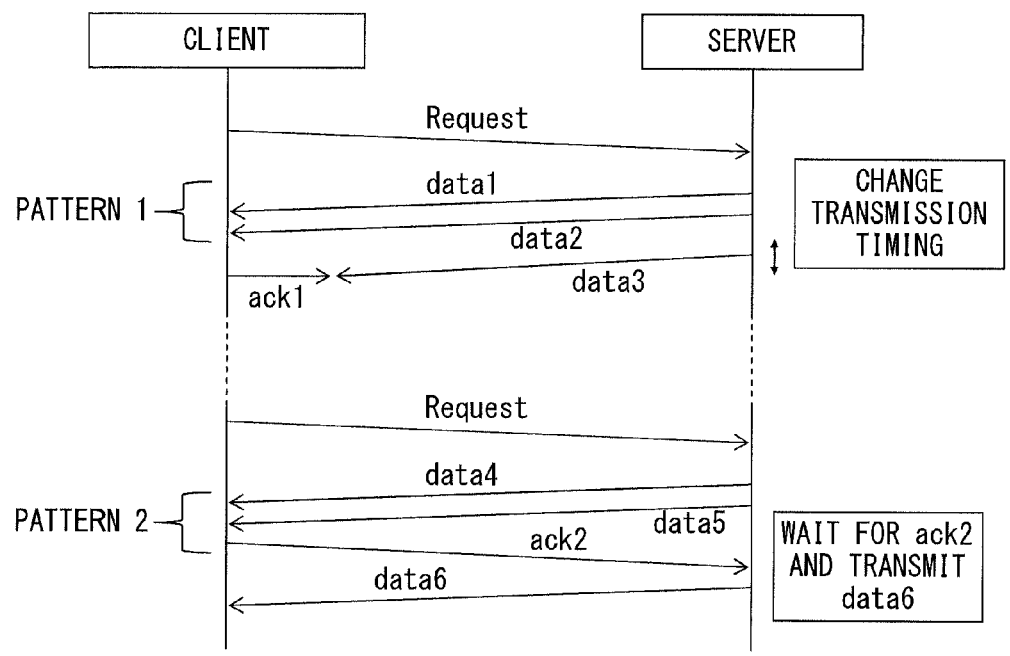
FIG. 13 illustrates an example of packet transmission/reception sequence in a failure analysis process in TCP protocol.

FIG. 13 illustrates an example of packet transmission/reception sequence in a failure analysis process realized by an embodiment having combination of configurations of the first, third, fourth and fifth embodiments described above. Hereinafter, according to the sequence diagram, an example of the failure analysis is explained.

It is assumed that the network communication apparatus is an apparatus that performs TCP communication such as a server computer providing a network service or a client computer receiving the network service.

In the network communication apparatus described above, the special mode packet assembly unit 102 (FIG. 1) has a function to change the transmission timing of data packets. In addition, in the network communication apparatus, the response analysis unit 106 has a function to detect a loss pattern when there is a mismatch in full-duplex/half-duplex settings.

The network communication apparatus has a function to detect a certain time schedule such as five minutes per hour or once a day, as the scheduler unit 701 and the schedule storage unit 702 (FIG. 7). The switching control unit 103 performs the mode switching when the schedule condition is satisfied.

The network communication apparatus has the input unit 901 (FIG. 9) that receives a mode switching instruction from outside. The switching control unit 103 performs the mode switching according to the instruction.

The network communication apparatus has functions to analyze packet losses, delay and delay fluctuation, as the network quality analysis unit 1101 (FIG. 11). The switching control unit 103 performs the mode switching according to the analysis result by the network quality analysis unit 1101 when the quality deteriorates. The specified value of the quality deterioration judgment includes (1) when a packet loss is observed, (2) when the loss rate reaches 1 percent or above, (3) when the delay exceeds 100 ms or reaches three times the normal delay, and (4) when the delay fluctuation (standard deviation) reaches twice the normal fluctuation, and so on.

Here, it is assumed that a first network device (for example, a server computer) and another network device (for example, a client computer) transmit and receive a series of packets via a packet network. In this network, for example, the special mode packet assembly unit 102 in the server alternately uses the following two patterns as the transmission pattern for transmitting a packet. The explanation below is based on the operation sequence in FIG. 13.

Pattern 1: When the client receives, for example, two data packets from the server with respect to "Request" to the server (for example, Web page download), the client returns "ack" to the server. In this case, the server adjusts the transmission timing of the third packet (that is, data3 packet) based on the transmission timing of the ack packet. For example, when the data2 packet and data3 packet are to be transmitted successively, the data3 packet is transmitted with 1 ms (millisecond) delay from the data2 packet in such a way that the data3 packet collides with the ack packet. In this case, if there is setting mistake of full-duplex/half-duplex, the probability of occurring packet loss is relatively high. Accordingly, the loss rate in the case in which an environment is deliberately created where a packet loss easily occurs if there is setting mistake of full-duplex/half-duplex is measured and saved (which is assumed as RESULT 1).

Pattern 2: In the same condition as in pattern 1, the server transmits the third packet (that is data6 packet) after the ack2 packet from the client is received. In this case, even if there is setting mistake of full-duplex/half-duplex, the probability of occurring packet loss is low. Accordingly, the loss rate in the case in which an environment is deliberately created where a packet loss does not easily occur even if there is setting mistake of full-duplex/half-duplex is measured and saved (which is assumed as RESULT 2).

The response analysis unit 106 statistically checks whether there is a meaningful difference between the RESULT 1 and the RESULT 2 mentioned above. When there is a meaningful difference, the result is given to the output unit 109 as there is a setting mistake of full-duplex/half-duplex.

An example of the judgment process of the setting mistake of full-duplex/half-duplex is described below.

In this example, the loss rate in the measurement pattern where collision does not easily occur is defined as "X" percent, the number of samples is defined as "N", and the loss rate with the measurement pattern where collision easily occurs is defined as "Y" percent.

The range R of 95 percent for the loss estimated from the measurement pattern where collision does not easily occur is as follows.

$$X - 1.96\ \mathrm{sqrt}(X(1-X)/N) < R < X + 1.96\ \mathrm{sqrt}(X(1-X)/N)$$

When the loss rate Y with the measurement pattern where collision easily occurs exceeds the upper-limit of the range R, it is determined that packet loss due to collision occurs. That is, when the mathematical condition below is satisfied, it is determined that packet loss due to collision occurs.

$$Y > X + 1.96\ \mathrm{sqrt}(X(1-X)/N)$$

Figure 14:
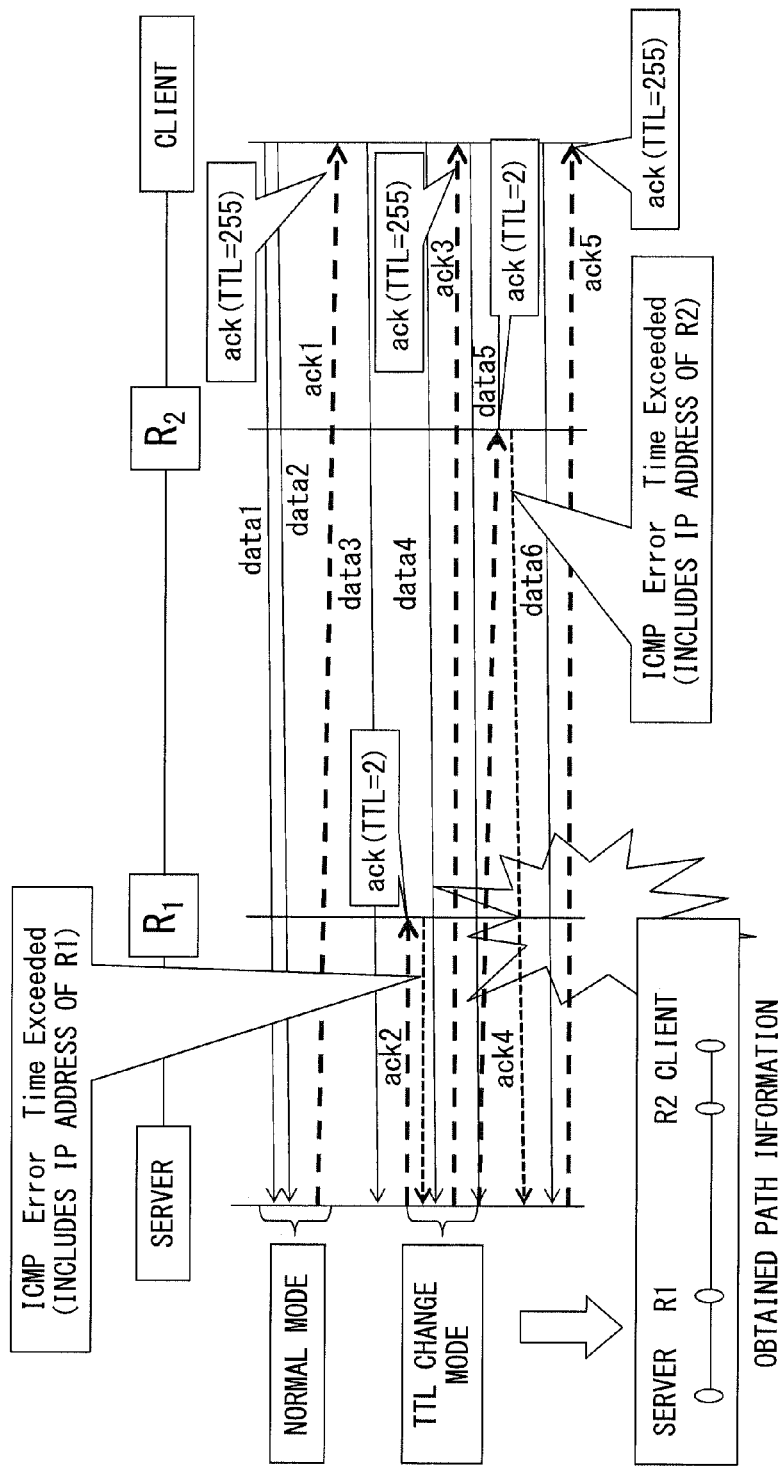
FIG. 14 illustrates an example of packet transmission/reception sequence in a path information detecting process in TCP protocol.

FIG. 14 illustrates an example of packet transmission/reception sequence in a path information detecting process realized by an embodiment having combination of configurations of the first, third, fourth and fifth embodiments described above. Hereinafter, according to the sequence diagram, an example of the path information detecting process is explained.

It is assumed that the network communication apparatus is an apparatus that performs TCP communication such as a server computer providing a network service or a client computer receiving the network service. In the example illustrated in FIG. 14, the network communication apparatus is a server computer.

In the network communication apparatus described above, the special mode packet assembly unit 102 (FIG. 1) has a function to change the TTL of the ack packet. In addition, in the network communication apparatus, the response analysis unit 106 has a function to detect the network configuration.

In addition, the network communication apparatus has functions to analyze packet losses, delay and delay fluctuation, as the network quality analysis unit 1101 (FIG. 11). The switching control unit 103 performs the mode switching according to the analysis result by the network quality analysis unit 1101 when the quality deteriorates. The method for the mode switching by the switching control unit 103 is substantially the same as in the case of the example in FIG. 13.

Here, it is assumed that a first network device (for example, a server computer) and another network device (for example, a client computer) transmit and receive a series of packets via a packet network. The special mode packet assembly unit 102 in the server for example uses the following pattern as the transmission pattern for transmitting packets. The explanation below is based on the operation sequence in FIG. 14.

First, the server returns an ack packet with TTL=1 to the client when the first data packet is received in data transmission sequence from the client (for example, uploading of image data). In FIG. 14, the server returns "ack 2" with TTL=1 to the client in response to the "data 3" from the client.

Next, the server returns a normal ack packet with TTL=255 for example when the second data packet is received. In FIG. 14, the server returns "ack 3" with TTL=255 to the client in response to the "data 4" from the client.

Then the server returns an ack packet with TTL=2 to the client when the third data packet is received. In FIG. 14, the server returns "ack 4" with TTL=2 to the client in response to the "data 5" from the client.

Further, the server returns an ack packet with TTL=225 when the fourth data packet is received. In FIG. 14, the server returns "ack 5" with TTL=255 to the client in response to the "data 6" from the client.

TTL in the ack packet is subtracted by one every time the ack packet goes through a router (R1, R2 in FIG. 14). Then, when the TTL reaches 0, the router returns an ICMP Error Time Exceeded packet including the IP address of the router to the transmission source. For this reason, the response analysis unit 106 (FIG. 1) in the server can detect the IP address of the router located between the server and correspondent node of the packet transmission. At this time, the response analysis unit 106 can detect the network configuration by preparing a list of the IP addresses obtained from sequentially received ICMP Error Time Exceeded packets. Note that in a communication system where one ack packet is returned every time when two or more data packets have been received, the special packet (ack packet with TTL=1, 2, . . . ) does not deteriorate the transfer performance and does not violate communication protocol.

The embodiments illustrated in FIG. 13 and FIG. 14 may be realized using the UDP while they have been explained based on the TCP.

Figure 15:
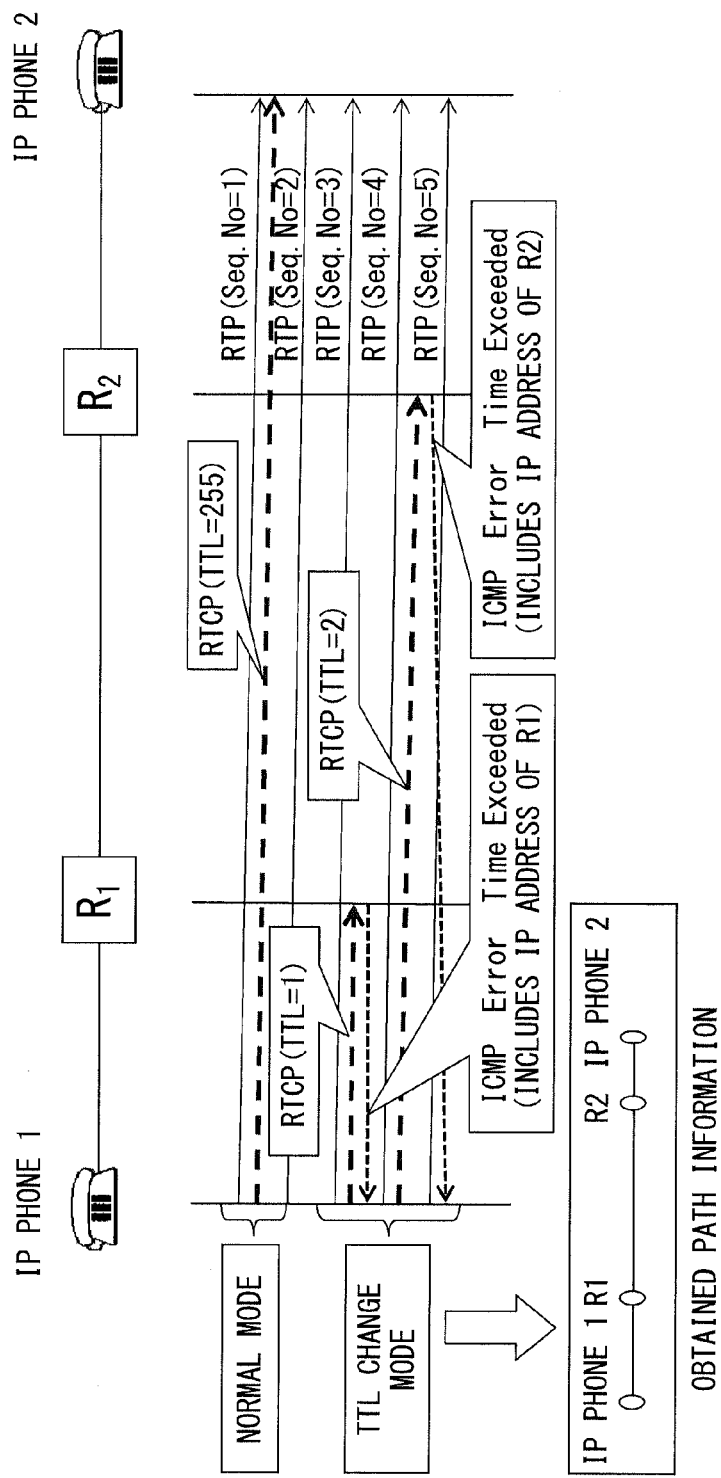
FIG. 15 illustrates an example of packet transmission/reception sequence in a path information detecting process in UDP protocol.

FIG. 15 illustrates an example of packet transmission/reception sequence in a path information detecting process realized by an embodiment having combination of configurations of the first, third, fourth and fifth embodiments described above, where the network communication apparatus is an apparatus (an IP phone terminal in FIG. 15) such as an IP phone terminal or a softphone terminal that performs UDP communication.

In the network communication apparatus described above, the special mode packet assembly unit 102 (FIG. 1) has a function to change TTL of the ack packet.

In addition, the network communication apparatus is substantially the same as that in FIG. 14 in that the network communication apparatus has functions to analyze packet losses, delay and delay fluctuation, as the network quality analysis unit 1101 (FIG. 11), and the switching control unit 103 performs the mode switching according to the analysis result. The method for the mode switching by the switching control unit 103 is substantially the same as in the case of the example in FIG. 13 or FIG. 14.

Here, it is assumed that a first network device (an IP phone 1 in FIG. 15) and another network device (an IP phone 2 in FIG. 15) transmit and receive a series of packets. The special mode packet assembly unit 102 in the IP phone for example uses the following pattern as the transmission pattern for transmitting a packet. The explanation below is based on the operation sequence in FIG. 15.

First, at the time of the transmission of RTCP from the IP phone 1, an ack packet with TTL=1 is used.

Next, the IP phone 1 transmits an RTCP packet with TTL=2.

TTL in the RTCP packet is subtracted by one every time the RTCP packet goes through a router (R1, R2 in FIG. 15). Then, when the TTL reaches 0, the router returns an ICMP Error Time Exceeded packet including the IP address of the router to the transmission source. For this reason, the response analysis unit 106 (FIG. 1) in the IP phone terminal can detect the IP address of the router located between the IP phone terminal and correspondent node of the packet transmission. At this time, the response analysis unit 106 can detect the network configuration by preparing a list of the IP addresses obtained from sequentially received ICMP Error Time Exceeded packets. Note that since the RTCP packet is not frequently transmitted, such operation to transmit the special packet (RTCP packet with TTL=1, 2, . . . ) does not deteriorate the transfer performance and does not violate communication protocol.

Figure 16:
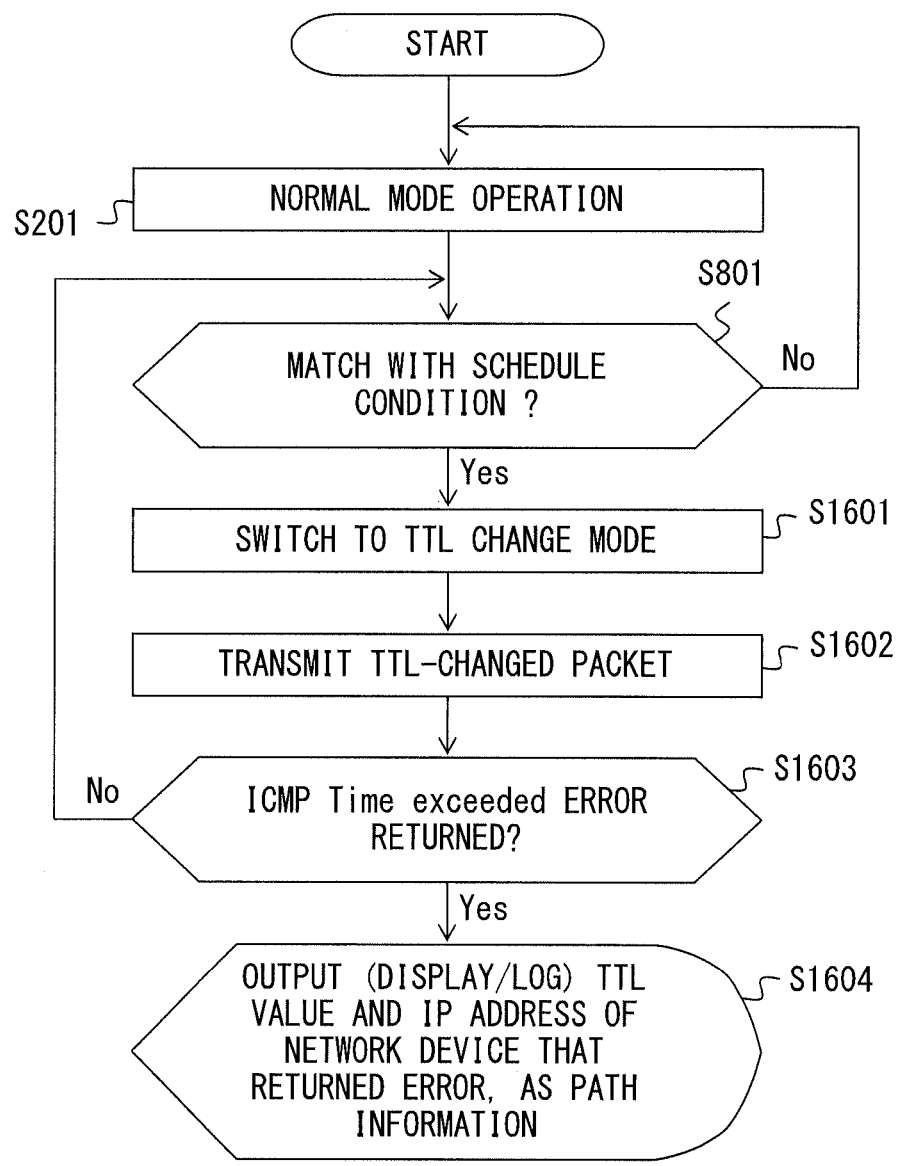
FIG. 16 is a flowchart illustrating an example of the path information detecting process.

FIG. 16 is a flowchart illustrating an example of operation of the switching control unit 103 in a case in which the third embodiment in FIG. 7 is applied to the example illustrated in FIG. 14 and FIG. 15 for instance. In FIG. 16, the same numbers are assigned to the steps in which similar processes are performed as in the first embodiment in FIG. 2 and the third embodiment in FIG. 8.

The switching control unit 103 switches operation modes to generate a transmission packet from the normal mode by the normal mode packet assembly unit 101 to the special mode by the special mode packet assembly unit 102 when the scheduler unit 701 detects that the schedule condition stored in the schedule storage unit 702 is satisfied.

The special mode packet assembly unit 102 first activates the TTL change mode in step S1601.

In step S1602, the special mode packet assembly unit 102 transmits a packet whose TTL is deliberately changed at the time of the packet transmission. In the example illustrated in FIG. 14, ack packets with TTL=1, 2, . . . are transmitted. In the example illustrated in FIG. 15, RTCP packets with TTL=1, 2, . . . are transmitted.

In step S1603, the response analysis unit 106 judges whether or not the ICMP Error Time Exceeded packet has been returned. When the judgment in step S1603 is NO, the process is returned to step S801. When the judgment in step S1603 is YES, in step S1604, the response analysis unit 106 gives the IP address of the network device that returned the ICMP Error Time Exceeded packet and corresponding TTL, as path information to the output unit 109. The output unit 109 may display the path information (network configuration information). The path information may be stored as log information.

FIG. 17 illustrates an example of packet transmission/reception sequence in size dependency process realized by an embodiment having combination of configurations of the first, third, fourth and fifth embodiments described above. In this sequence, the network communication apparatus is an apparatus that performs TCP communication such as a server computer providing a network service or a client computer receiving the network service. In the example illustrated in FIG. 17, the network communication apparatus is a server computer.

In the network communication apparatus described above, the special mode packet assembly unit 102 (FIG. 1) has a function to change MTU (Max Transfer Unit) size. In addition, in the network communication apparatus, the response analysis unit 106 has a function to detect the bit error loss. The method for the mode switching by the switching control unit 103 is substantially the same as in the case of the example in FIG. 13 through FIG. 15.

Here, it is assumed that a first network device (a server in FIG. 17) and another network device (a client in FIG. 17) transmit and receive a series of packets via a packet network. The special mode packet assembly unit 102 in the server for example uses the following pattern as the transmission pattern of the transmission packet. The explanation below is based on the operation sequence in FIG. 17.

When data to be transmitted from the server in response to a request from the client (for example, downloading of a Web page) is large enough, the server divides and transmits the data in the MTU size (1500 bytes in Ethernet (registered trademark) for example) in normal mode. On the other hand, the special mode packet assembly unit 102 performs transmission while changing the MTU size. In FIG. 17, the MTC size of the data1 packet, data2 packet, data3 packet is, for example, 100 bytes, 800 bytes, 1500 bytes, respectively.

The response analysis unit 106 measures the occurrence trend of packet loss while changing the MTC size. That is, the response analysis unit 106 statistically checks whether or not the packet transmission size has correlation with the occurrence trend of packet loss. When there is correlation, the response analysis unit 106 estimates that bit error may occur on the path in the network and gives the estimation result to the output unit 109. The output unit 109 may display the estimation result. The estimation result may be stores as log information.

Details of the bit error loss judgment process by the response analysis unit 106 are as follows.

First, the response analysis unit 106 obtains the correlation coefficient (−1 to 1) between the packet size and the loss rate by transmitting packets in different packet sizes (MTU sizes). Then the response analysis unit 106 judges the possibility of bit error as follows.

Figure 18:
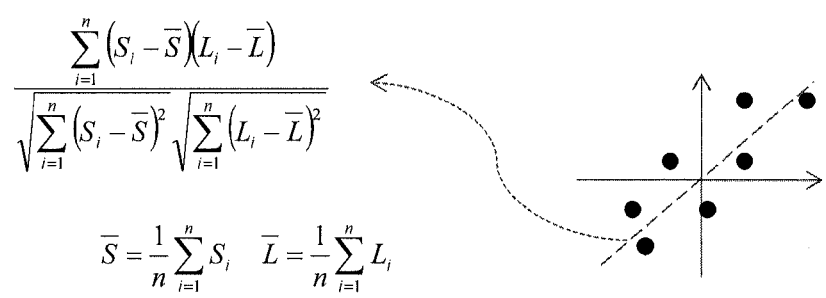
FIG. 18 is a diagram explaining judgment process of bit error loss.

(1) 0.7 and above (there is a strong correlation between the size and the loss rate): there is a strong possibility of a bit error (2) 0.4-0.7 (there is a weak correlation between the size and the loss); there is a possibility of a bit error (3) below 0.4 (no correlation): no bit error The response analysis unit 106 may obtain the correlation coefficient by the calculation below, where Li (i=1, 2, ... n) is the loss rate when the packet size is Si (see FIG. 18).

$$\frac{\sum_{i=1}^{n}(S_i - \overline{S})(L_i - \overline{L})}{\sqrt{\sum_{i=1}^{n}(S_i - \overline{S})^2}\sqrt{\sum_{i=1}^{n}(L_i - \overline{L})^2}}$$

$$\overline{S} = \frac{1}{n}\sum_{i=1}^{n}S_i$$

$$\overline{L} = \frac{1}{n}\sum_{i=1}^{n}L_i$$

Figure 19:
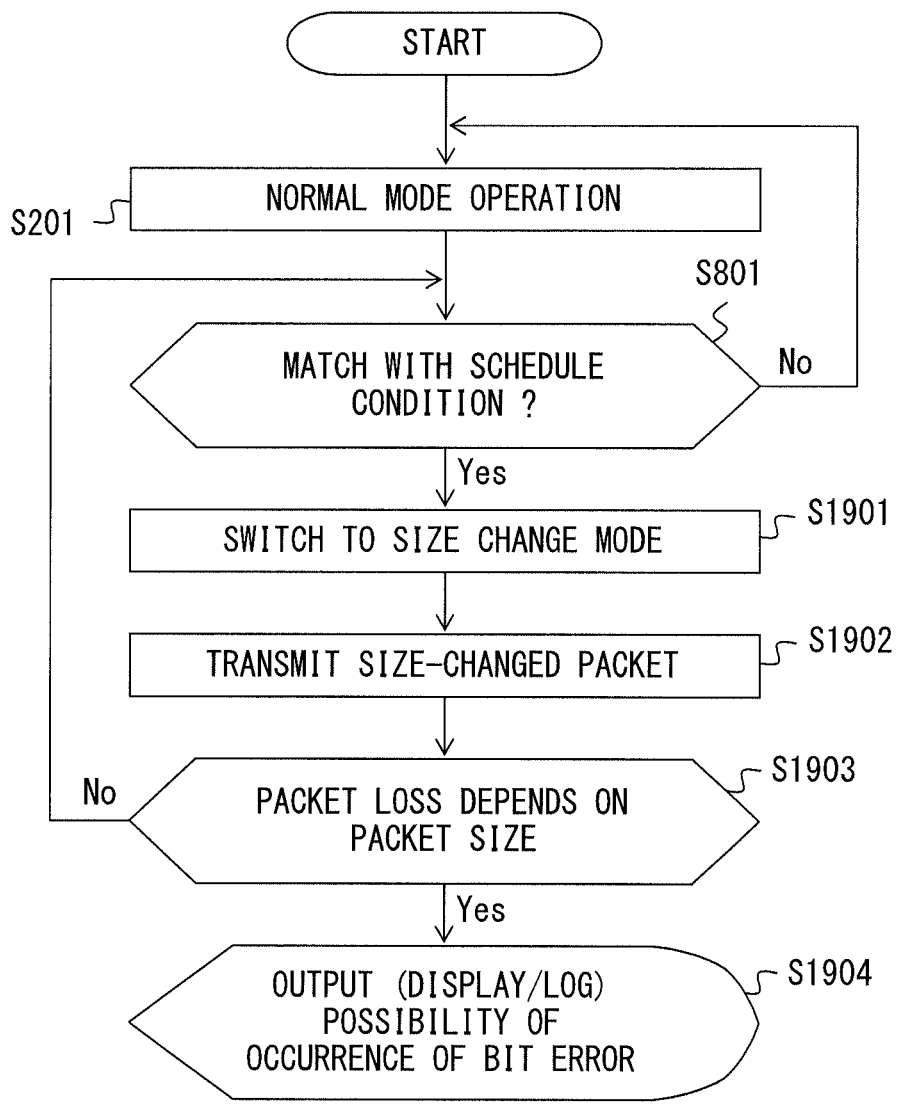
FIG. 19 is a flowchart illustrating an example of the size dependence process.

FIG. 19 is a flowchart illustrating an example of operation of the switching control unit 103 in a case in which the third embodiment in FIG. 7 is applied to the example illustrated in FIG. 17 for example. In FIG. 19, the same numbers are assigned to the steps in which similar processes are performed as in the first embodiment in FIG. 2 and the third embodiment in FIG. 8.

The switching control unit 103 switches operation modes to generate transmission packets from the normal mode by the normal mode packet assembly unit 101 to the special mode by the special mode packet assembly unit 102 when the scheduler unit 701 detects that the schedule condition stored in the schedule storage unit 702 is satisfied.

The special mode packet assembly unit 102 first activates the size change mode in step S1901.

In step S1902, the special mode packet assembly unit 102 transmits a plurality of packets while MTU size being changed as illustrated in FIG. 17.

In step S1903, the response analysis unit 106 judges whether or not the packet loss rate depends on packet size. When the judgment in step S1903 is NO, the process is returned to step S801. When the judgment in step S1903 is YES, since the trend of the packet loss depends on the packet size, the response analysis unit 106 judges that there is a possibility of a bit error and gives the judgment result to the output unit 109. The output unit 109 may displays the judgment result. The Judgment result may be stored as log information.

Figure 20:
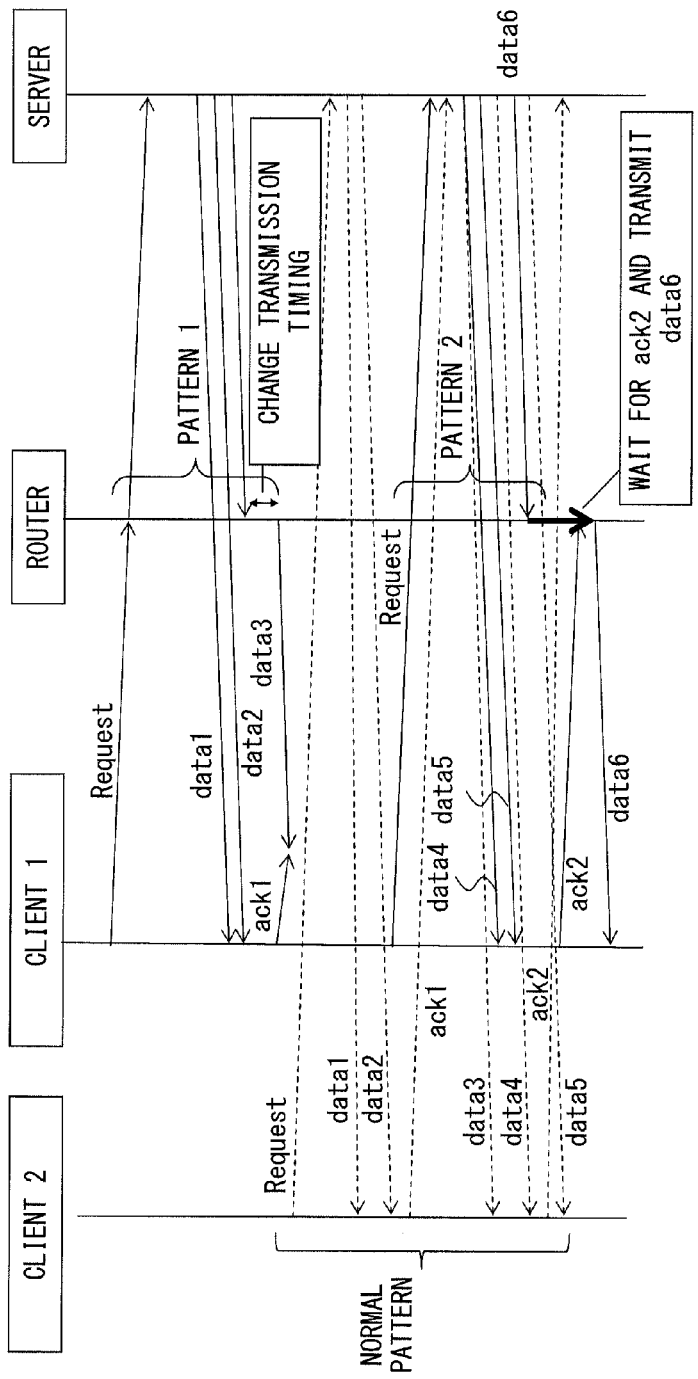
FIG. 20 illustrates an example of packet transmission/reception sequence in a case in which the second embodiment is applied to a router being a network relay apparatus.

FIG. 20 illustrates an example of packet transmission/reception sequence in a case in which the second embodiment described above is applied to a router being a network relay apparatus. In this example, the network communication apparatus is a packet transfer device such as a router or a layer 3 switch.

In the network communication apparatus described above, the special mode packet assembly unit 102 (FIG. 1) has a function to change the transmission timing of a data packet. In addition, in the network communication apparatus, the response analysis unit 106 has a function to detect a loss pattern when there is a mismatch in full-duplex/half-duplex settings.

In addition, the network communication apparatus has functions to analyze packet losses, delay and delay fluctuation, as the network quality analysis unit 1101 (FIG. 11). The switching control unit 103 performs the mode switching according to the analysis result by the network quality analysis unit 1101 when the quality deteriorates. The method for mode switching by the switching control unit 103 is substantially the same as in the case of the example in FIG. 13.

Furthermore, the network communication apparatus has a function to identify a session according to the pair of the IP address and the port number of the packet transmission source and the IP address and the port number of the packet transmission destination, as the session identification unit 501.

The switching control unit 103 selects a specified session as follows, for example, based on the session identification result by the session identification unit 501.

(1) A session in which quality degradation (loss, delay and the like) occurs (2) According to a session management table (not particularly illustrated in the drawing) which defines an order of sessions to be selected (3) Specified from outside Then the switching control unit 103 performs the mode switching control only for the selected session, as described in the second embodiment. In FIG. 20, the communication between the server and the client 1 is represented by solid line, while the communication between the server and the client 2 is represented by broken line.

Here, it is assumed that a first network device (for example, a server computer) and another network device (for example, a client computer) transmit and receive a series of packets via a packet network. The special mode packet assembly unit 102 in the server for example alternately uses the two patterns as the transmission pattern similarly to the example illustrated in FIG. 13. In the operation sequence in FIG. 20, the router can provide the control in such a way that the mode switching is performed only for the communication between client 1 and the server, and no mode switching is performed for the communication between client 2 and the server. In this case, the response analysis unit 106 checks whether there is a setting mistake of full-duplex/half-duplex for the communication between client 1 and the server.

According to the technique described above, it is possible to search for the cause, location of a network failure and to collect network configuration information while maintaining the normal network service, using the traffic used by the normal network service. In addition, according to the technique described above, it is possible to search for the cause or the location of the network failure, and to obtain the configuration information of the network, when the traffic quality degrades or based on a scheduled operation/manual operation.

FIG. 21 illustrates an example of the hardware configuration of a computer to realize the network communication apparatus described above.

The computer illustrated in FIG. 21 has a CPU 2101, a memory 2102, an input device 2103, an output device 2104, an external storage device 2105, a portable recording medium driving device 2106 to which a portable recording medium 2109 is inserted, and a network connection device 2107, and has a configuration in which these elements are connected to each other by a bus 2108. The configuration illustrated in FIG. 21 is an example of a computer that can realize the system described above, and such a computer is not limited to this configuration. The computer is realized as a server computer or a client computer, or, is realized as a router apparatus or an L3 switch and the like.

The CPU 2101 performs control of the computer. The memory 2102 is a memory such as a RAM and the like that temporarily stores a program and/or data stored in the external storage device 2105 (or a portable recording medium 2109) upon execution of the program, data upgrade, and so on. The CPU 2101 controls the overall control by reading out the program on the memory 2102, and executing the program.

The input device 2103 may include, for example, a keyboard, a mouse and the like and an interface control apparatus for them. The input device 2103 detects input operations by the user by means of the keyboard, mouse and the like, and sends notification of the detection result to the CPU 2101.

The output device 2104 may include a display apparatus, a printer and an interface control apparatus for them. The output device 2104 outputs data transmitted by the control of the CPU 2101 to the display apparatus and the printer.

The external storage device 2105 is a hard disk storage apparatus for example, which is mainly used for storing various data and programs.

The portable recording medium driving device 2106 accommodates the portable recording medium 2109 such as an optical disk, SDRAM, compact flash (registered trademark) and so on, and has a supplementary role for the external storage device 2105.

The network connection device 2107 is a device for connecting the communication line of LAN (local area network) or WAN (wide area network) for example.

The system according to each embodiment described above is realized by with the program having functions required for the system and being executed by the CPU 2101. The program may be distributed while being recorded in the external storage device 2101 or the portable recording medium 2109, or may be configured to be obtained from a network by the network connection device 2107.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. A network failure information collection apparatus to collect information about network failure in a network communication apparatus connected to a packet network, comprising:

a normal mode packet assembly unit to assemble a transmission packet from transmission data output from an application in a normal mode being a procedure used when a transmission process is performed by specified communication protocol and to transmit the transmission packet to the packet network;

a special mode packet assembly unit to assemble the transmission packet from the transmission data in a special mode being a procedure in which a procedure for collecting failure information is embedded into the procedure used when a transmission process is performed by the specified communication protocol and to transmit the transmission packet to the packet network;

a switching control unit to activate the normal mode packet assembly unit or the special mode packet assembly unit selectively;

a response analysis unit to analyze a response to the transmission packet based on a received packet from the packet network and to collect failure information according to a behavior of the response to the transmission packet transmitted from the special mode packet assembly unit; and an output unit to output the failure information.

2. The network failure information collection apparatus according to claim 1, further comprising a session identification unit to identify a session of the packet, wherein the switching control unit switches operations between the normal mode packet assembly unit and the special mode packet assembly unit when session identification information in the session identification unit is satisfied.

3. The network failure information collection apparatus according to claim 1, further comprising:
- a schedule storage unit to store schedule information for switching the normal mode and the special mode; and
- a scheduler unit to judge whether or not a schedule condition stored in the schedule storage unit is satisfied, wherein
- the switching control unit switches operations between the normal mode packet assembly unit and the special mode packet assembly unit based on whether or not the schedule condition stored in the schedule storage unit is satisfied.

4. The network failure information collection apparatus according to claim 1, further comprising
- an input unit to instruct switching of the normal mode and the special mode, wherein
- the switching control unit switches operations between the normal mode packet assembly unit and the special mode packet assembly unit according to an switching instruction by the input unit.

5. The network failure information collection apparatus according to claim 1, further comprising
- a network quality analysis unit to analyze network quality of the packet network, wherein
- the switching control unit switches operations between the normal mode packet assembly unit and the special mode packet assembly unit according to an analysis result of the network quality by the network quality analysis unit.

6. A network failure information collection method to collect information about network failure in a network communication apparatus connected to a packet network, comprising:
- selecting a normal mode or a special mode, the normal mode assembling a transmission packet from transmission data output from an application with a procedure used when a transmission process is performed by specified communication protocol, the special mode assembling the transmission packet from the transmission data with a procedure in which a procedure for collecting failure information is embedded into the procedure used when a transmission process is performed by the specified communication protocol;
- transmitting the transmission packet to the packet network;
- analyzing a response to the transmission packet based on a received packet from the packet network
- collecting failure information according to a behavior of the response to the transmission packet transmitted in the special mode; and
- outputting the failure information.

7. The network failure information collection method according to claim 6, wherein
- operation is switched between the normal mode and the special mode when a specified session identification information is satisfied.

8. The network failure information collection method according to claim 6, wherein operation is switched between the normal mode and the special mode when a specified schedule condition is satisfied.

9. The network failure information collection method according to claim 6, wherein
- operation is switched between the normal mode and the special mode according to a switching instruction to switch the operation mode.

10. The network failure information collection method according to claim 6, wherein
- operation is switched between the normal mode and the special mode according to an analysis result of the network quality.

11. A non-transitory computer readable storage medium for storing a computer program which enables a computer to perform a network failure information collection method for collecting information about network failure in a network communication apparatus connected to a packet network, the method comprising:
- selecting a normal mode or a special mode, the normal mode assembling a transmission packet from transmission data output from an application with a procedure used when a transmission process is performed by specified communication protocol, the special mode assembling the transmission packet from the transmission data with a procedure in which a procedure for collecting failure information is embedded into the procedure used when a transmission process is performed by the specified communication protocol;
- transmitting the transmission packet to the packet network;
- analyzing a response to the transmission packet based on a received packet from the packet network
- collecting failure information according to a behavior of the response to the transmission packet transmitted in the special mode; and
- outputting the failure information.

12. The non-transitory computer readable medium according to claim 11, wherein
- operation is switched between the normal mode and the special mode when a specified session identification information is satisfied.

13. The non-transitory computer readable medium according to claim 11, wherein
- operation is switched between the normal mode and the special mode when a specified schedule condition is satisfied.

14. The non-transitory computer readable medium according to claim 11, wherein
- operation is switched between the normal mode and the special mode according to a switching instruction to switch the operation mode.

15. The non-transitory computer readable medium according to claim 11, wherein
- operation is switched between the normal mode and the special mode according to an analysis result of the network quality.

* * * * *